US008825539B2

(12) United States Patent
Hurewitz et al.

(10) Patent No.: US 8,825,539 B2
(45) Date of Patent: Sep. 2, 2014

(54) COMPUTER-BASED SYSTEMS AND METHODS FOR COMPUTING MARKET-ADJUSTED ELASTICITIES FOR ACCOUNTS

(75) Inventors: Barry S. Hurewitz, New York, NY (US); Vaughn Harvey, New York, NY (US); Thami Rachidi, Bayonne, NJ (US); Scott Solomon, New York, NY (US)

(73) Assignee: Morgan Stanley & Co. LLC, New York, NY (US)

( * ) Notice: Subject to any disclaimer, the term of this patent is extended or adjusted under 35 U.S.C. 154(b) by 0 days.

(21) Appl. No.: 13/564,077

(22) Filed: Aug. 1, 2012

(65) Prior Publication Data
US 2013/0054487 A1  Feb. 28, 2013

Related U.S. Application Data

(60) Provisional application No. 61/527,971, filed on Aug. 26, 2011.

(51) Int. Cl.
*G06Q 30/02* (2012.01)
*G06Q 40/06* (2012.01)
*G06Q 10/04* (2012.01)
*G06Q 10/06* (2012.01)

(52) U.S. Cl.
USPC ......... 705/36 R; 705/7.12; 705/35; 705/7.29; 705/14.41

(58) Field of Classification Search
CPC ....... G06Q 40/06; G06Q 40/00; G06Q 40/04; G06Q 10/06; G06Q 10/04; G06Q 10/0631; G06Q 30/02
USPC ............ 705/36 R, 35, 37, 14.41, 14.42, 7.12, 705/7.29, 29
See application file for complete search history.

(56) References Cited

U.S. PATENT DOCUMENTS

| 6,018,722 | A  | * | 1/2000 | Ray et al. | 705/36 R |
| 6,792,399 | B1 | * | 9/2004 | Phillips et al. | 705/36 R |

(Continued)

FOREIGN PATENT DOCUMENTS

| EP | 2189905 A1 | * | 5/2010 | G06F 9/50 |
| EP | 2261851 A1 | * | 12/2010 | G06Q 30/00 |

(Continued)

OTHER PUBLICATIONS

Figs. 33, 45, and 48 of Cavander et al. (US 2010/0145793).*

(Continued)

*Primary Examiner* — Barbara Joan Amelunxen
(74) *Attorney, Agent, or Firm* — K&L Gates LLP

(57) ABSTRACT

Relating resources expended by a securities research entity to revenue received by a financial services firm including the securities research entity. A computer system may receive account revenue data indicative of revenue received by the financial services firm from a first customer investment account for at least securities trade execution by the financial services firm for the first customer investment account. The computer system may also receive expense data indicative of expenses incurred by the securities research entity on behalf of the first customer investment account. The computer system may determine a market condition-adjusted elasticity for the first customer investment account. The market condition-adjusted elasticity, determined based on at least one market condition for securities, may indicate a relationship between the expenses incurred by the research entity on behalf of the first customer investment account and the revenue received by the financial services firm from the first customer investment account.

21 Claims, 5 Drawing Sheets

(56) References Cited

U.S. PATENT DOCUMENTS

| | | | | |
|---|---|---|---|---|
| 7,689,490 | B2* | 3/2010 | Hurewitz | 705/36 R |
| 7,702,555 | B1* | 4/2010 | Breeden et al. | 705/36 R |
| 7,734,517 | B2 | 6/2010 | Hurewitz | |
| 7,769,654 | B1 | 8/2010 | Hurewitz | |
| 8,630,884 | B2* | 1/2014 | Carter | 705/7.11 |
| 2002/0035531 | A1* | 3/2002 | Push | 705/36 |
| 2004/0093296 | A1* | 5/2004 | Phelan et al. | 705/36 |
| 2006/0041480 | A1* | 2/2006 | Briggs | 705/14 |
| 2008/0140549 | A1* | 6/2008 | Eder | 705/35 |
| 2008/0235073 | A1* | 9/2008 | Cavander et al. | 705/9 |
| 2009/0043637 | A1* | 2/2009 | Eder | 705/10 |
| 2009/0144117 | A1* | 6/2009 | Cavander et al. | 705/8 |
| 2009/0144123 | A1* | 6/2009 | Malov et al. | 705/10 |
| 2009/0216597 | A1* | 8/2009 | Cavander et al. | 705/8 |
| 2010/0036700 | A1* | 2/2010 | Cavander et al. | 705/8 |
| 2010/0114624 | A1* | 5/2010 | Lakshminarayan et al. | 705/7 |
| 2010/0114648 | A1* | 5/2010 | Lakshminarayan et al. | 705/10 |
| 2010/0145793 | A1* | 6/2010 | Cavander et al. | 705/14.42 |
| 2010/0290603 | A1 | 11/2010 | Gemayel et al. | |
| 2013/0054486 | A1* | 2/2013 | Eder | 705/36 R |
| 2013/0073442 | A1* | 3/2013 | Eder | 705/37 |

FOREIGN PATENT DOCUMENTS

| | | |
|---|---|---|
| WO | WO2007/038587 A2 | 4/2007 |
| WO | WO 2009105705 A1 * | 8/2009 |
| WO | WO 2010051433 A1 * | 5/2010 |

OTHER PUBLICATIONS

"SAS/ETS Examples, Calculating Price Elasticity of Demand," downloaded from http://support.sas.com/rnd/app/examples/ets/simpelast/index.htm on Jan. 27, 2014.

Macpherson, David, "Semi-Log Model," Mar. 22, 1999, downloaded from http://www.samos.aegean.gr/actuar/a.katsis/Regression/logarithmic%20models.pdf on Jan. 27, 2014.

C. Agiaklogou & D. Yannelis, "Estimation of Price Elasticities for International Telecommunications Demand," Int'l Advances in Economic Research, 2006, vol. 12, issue 1, pp. 131-137.

Fox, John, "Linear Mixed Models, Appendix to An R and S-Plus Comapnion to Applied Regression," 2002, downloaded from http://cran.r-project.org/doc/contrib/Fox-Companion/appendix-mixed-models.pdf on Jan. 27, 2014.

"Best Practices Report: The Broker Voting Process, Commentary and Analysis," Thomson Extel Surveys, Feb. 2008.

* cited by examiner

COMPUTER-BASED SYSTEMS AND METHODS FOR COMPUTING MARKET-ADJUSTED ELASTICITIES FOR ACCOUNTS

PRIORITY CLAIM

The present application claims the benefit of U.S. Provisional Patent Application Ser. No. 61/527,971, entitled "COMPUTER-BASED SYSTEMS AND METHODS FOR COMPUTING MARKET-ADJUSTED ELASTICITIES FOR ACCOUNTS," filed Aug. 26, 2011, which is incorporated herein by reference in its entirety.

BACKGROUND

In the securities research industry, so called "sell-side firms" provide, among other things, research regarding securities (such as stocks or bonds) to, among others, so-called "buy-side firms," which are typically institutional investors such as mutual funds, hedge funds, pension funds, etc. Particularly for equity research, sell-side firms typically employ a number of analyst teams that analyze and publish research reports about equity securities for publicly-traded companies in different industry sectors and/or geographic regions. For example, a sell-side firm may have a North America pharmaceuticals research team that analyzes North American publicly-traded pharmaceutical companies, a North America oil services research team that analyzes North American publicly-traded oil services companies, a North America semiconductors research team that analyzes publicly-traded companies that make and sell semiconductor products, and so on. The sell-side firm might also have corresponding European and/or Asian research analyst teams.

The analyst teams typically include a primary analyst and several research associates, though some teams may have other positions as well. These research teams generate numerous different types of research touch points for consumers of the research (e.g., the buy-side firms). The research touch points may include research reports (e.g., published electronic or hard copy reports), one-to-one telephone calls or meetings with contacts at the buy-side firms, tailored or blast emails and voicemails to such contacts, and/or other events such as seminars, conferences, corporate road shows, and meetings with corporate management.

A sell-side firm also typically employs salespeople who facilitate the distribution of the work product of the various research teams to appropriate contacts at the buy-side firms. The contacts typically are associated with one or more investment funds or accounts of the buy-side firm. A salesperson typically has contacts at many different buy-side firms, and those contacts may be interested in research work product from many different analyst teams at the sell-side firm. One role of a sell-side salesperson is to alert and distribute to his/her contacts work product from the various sell-side analyst teams.

SUMMARY

In one general aspect, the present invention is directed to computer-based systems and method that relate resources expended by a research entity to revenue received by a financial services firm including the securities research entity. In various embodiments, a market-adjusted elasticity is determined for accounts, where the market condition-adjusted elasticity is determined based on at least one market condition for securities These and other aspects of the present invention are described below.

FIGURES

Various embodiments of the present invention are described herein by way of example in conjunction with the following figures, wherein.

DESCRIPTION

Various embodiments of computer-based systems and methods of the present invention are described below. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and illustrative. Variations and changes thereto may be made without departing from the scope of the claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Figure 1:
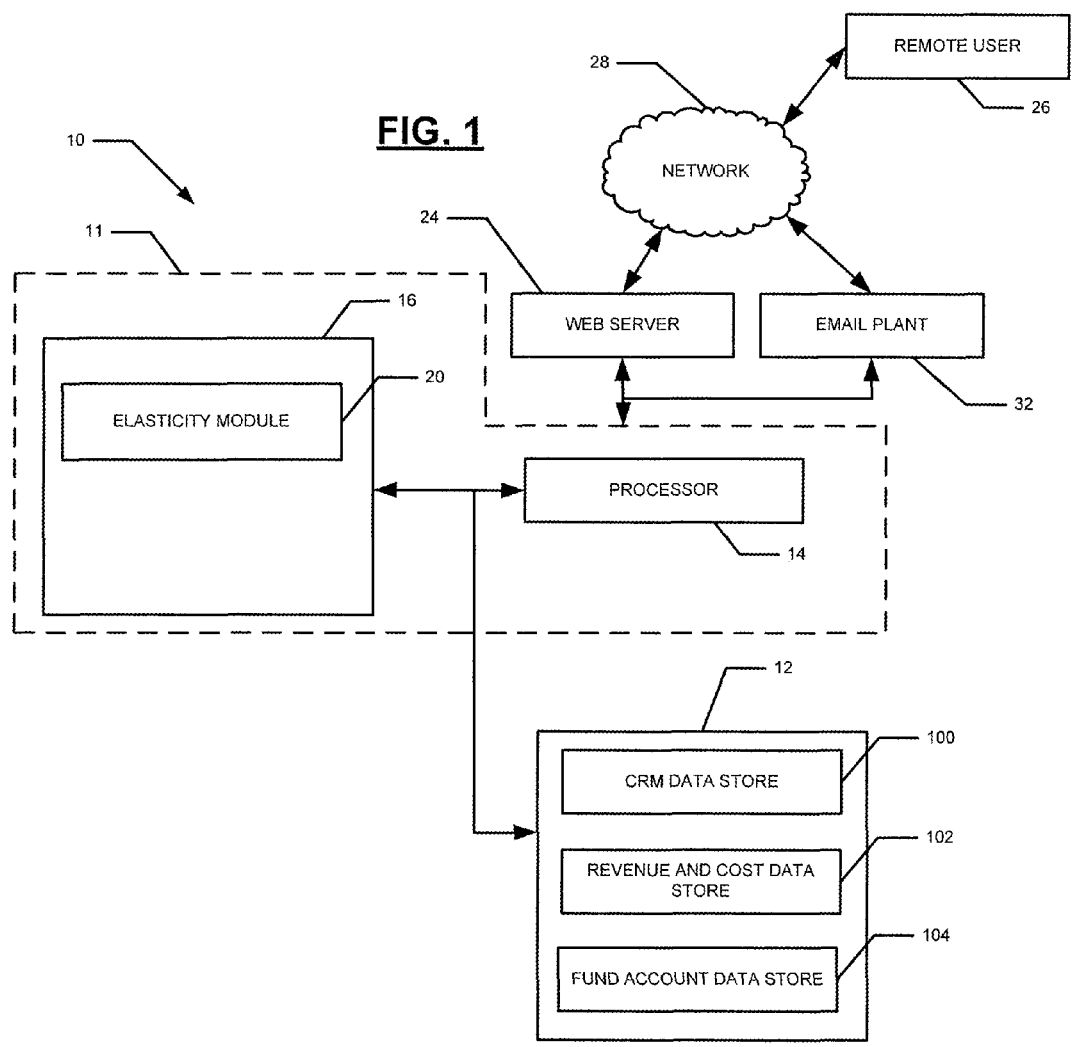
FIG. 1 is block diagram of a computer system according to various embodiments of the present invention.

FIG. 1 is a diagram of a computer-based system 10 according to various embodiments of the present invention. The computer-based system 10 may comprise one or more networked, electronic computer devices 11, such as servers, personal computers, workstations, mainframes, laptops, and/or handheld computing devices. As shown in FIG. 1, the system 10 may comprise a computer-based data storage system 12, one or more processor circuits 14, and one or more memory units 16. For convenience, only one processor circuit (referred to hereinafter simply as "processor") 14 and one memory unit 16 are shown in FIG. 1, although it should be recognized that the computer system 10 may comprise multiple processors and/or multiple memory units 16. The memory 16 may store a number of software modules, such as module 20 as shown in FIG. 1. The module 20 may comprise software code that is executed by the processor 14, which execution causes the processor 14 to perform various actions dictated by the software code of the various modules, as explained further below. The processor 14 may have one or multiple cores. The memory 16 may comprise primary computer memory, such as a read only memory (ROM) and/or a random access memory (e.g., a RAM). The memory could also comprise secondary computer memory, such as magnetic or optical disk drives or flash memory, for example.

The data storage system 12 may comprise a number of data stores, which may be implemented as computer databases, data files, directories, or any other suitable system for storing data for use by computers. The data storage system 12 may be embodied as solid state memory (e.g., ROM), hard disk drive systems, RAID, disk arrays, storage area networks (SANs), and/or any other suitable system for storing computer data. In addition, the data storage system 12 may comprise caches, including web caches and database caches.

Embodiments of the present invention are described herein in the context of a sell-side equity research department that provides research work product to contacts at buy-side firms, where the equity research department comprises, among other things, multiple analyst teams that cover different industry sectors and/or geographic regions, and salespeople with contacts at the sell-side firms. It should be noted that the analyst teams preferably also have contacts at the buy-side firms. In addition, different salespeople and/or analysts may have one or more common contacts at a buy-side firm. The collective contacts of the various salespeople and analyst teams of the equity research department are sometimes referred to herein as contacts of the equity research department.

While embodiments and aspects of the present invention are described herein in the context of a sell-side equity research department, it should be noted that the embodiments and aspects of the present invention are not necessarily limited to sell-side equity research departments unless specifically noted, and that embodiments or aspects of the present invention described herein may be applicable to industries other than sell-side equity research departments, such as fixed-income research departments, other types of research departments that produce research work product that is consumed by clients or customers of the research department, or applicable to any organization or enterprise with customers, clients or contacts, for example.

As shown in FIG. 1, the computer system 10 may comprise an elasticity module 20 that, for example, determines the elasticity of buy-side firms (or accounts) serviced by the sell-side equity research department. The data storage system 12 may comprise, for example, a customer relationship management (CRM) data store 100, a revenue and expenses data store 102, and fund account data 104. The CRM data store may store data regarding the contacts of the equity research department, including contact information for the contacts (email addresses, mailing addresses, phone numbers, etc.) in addition to data regarding interaction between the various contacts and members of the sell-side equity research department, such as emails, phone calls, and meetings involving the various contacts and members of the equity research department. The revenue and expenses data store 102 may store data about revenue generated and expenses incurred by the equity research department. Such data may include, at the account and/or contact level, data for revenue attributable to accounts and/or contacts of the equity research department and expenses incurred in generating the research work product and servicing the accounts and/or contacts of the equity research department. More details regarding such data stores 100, 102 may be found in the following patent documents that are incorporated herein by reference in their entirety: U.S. Pat. Nos. 7,734,517; 7,689,490; 7,769,654; U.S. published patent application Pub. No. 2010/0290603; and WO 2007/038587 A2.

The fund account data 104 may store data about financial holdings and/or trade flow (e.g., transactions) of buy-side funds for accounts that are clients of the equity research department. This data may be utilized in various embodiments by the contact interest profile module 20, as described in more detail below, in determining the contact interest profiles. This data may be gathered from filings (e.g., SEC filings) by the buy-side accounts, trade execution data from one or more brokerages that execute trades on behalf of the buy-side accounts, and/or any other reliable source.

The computer system 10 may also include one or more web servers 24 in communication with the computer 11. The web server 24 may host web sites accessible by a remote user 26, via an electronic data communication network 28. The network 28 may comprise one or more LANs, WANs, the Internet, and/or an extranet, or any other suitable data communication network allowing communication between computer systems. The network 28 may comprise wired and/or wireless links. The computer system 10 may also comprise a computer-based email plant 32. The computer-based email plant 32 may be implemented as one or more computer servers that handle the email protocol for the organization or enterprise associated with the computer system 10. The email plant 32 may facilitate the sending and receiving of internal and external emails via the computer data network 28.

A typical sell-side global equity research department may include hundreds of analyst teams worldwide, such as 100-300 different worldwide analyst teams. The various analyst teams may collectively cover numerous (e.g., thousands, such as 5000 or more) stocks that are publicly traded on stock exchanges worldwide (such as North American exchanges, (e.g., the New York Stock Exchange and NASDAQ), European exchanges (e.g., the London Stock Exchange and Euronext), Asian exchanges (e.g., Tokyo and Shanghai stock exchanges), etc.). Such publicly-traded stocks are commonly referred to, and are sometimes referred to herein, as "tickers" because each publicly traded stock is ordinarily associated with a ticker symbol. In addition, the various analyst teams in an equity research department collectively generate numerous research work products every business day (e.g., trading days of the various exchanges). For example, the various analyst teams in an equity research department may collectively generate 100 to 200 research reports or other work product in a given business day, at various times throughout the business day, but ordinarily concentrated around the opening of the local stock exchange. A typical global equity research department also has numerous buy-side contacts (e.g., 5000 or so buy-side contacts) associated with various investment funds or accounts.

According to various embodiments, the elasticity module 20 may be utilized to calculate one or more elasticities describing relationships between resources spent by the equity research department, sometimes including sales people of the sell-side firm, and revenue received from accounts of the sell-side firm. Research resources provided by the equity research department may include written work product, as well as the time of various research department personnel spent generating work product and communicating it to sell-side account contacts. Specific examples of research resources may include, for example, phone calls between an analyst team member and a contact, one-to-one or small group meetings with a contact or contacts, conferences or conference calls between an analyst team member and one or more contacts, tailored emails or voicemails sent to the client either by an analyst team member or a sales person, blast emails or voicemails sent to a contact, as well as published research work product.

Due to the nature of the relationships between buy-side and sell-side firms, there is not necessarily a direct relationship between the equity research resources provided to a buy-side firm and the compensation received from the buy-side firm in the form of brokerage business. Systems and methods for allocating equity research resources in view of this potential disconnect are disclosed in U.S. Pat. No. 7,689,490, which is incorporated herein by reference in its entirety. Additional challenges arise, however, because there is almost always a delay between the provision of equity research resources by a sell-side firm to a buy-side firm and the receipt of compensation from the buy-side firm in the form of trade execution orders. For example, the broker vote process may introduce an inherent delay into a sell-side firm's compensation for equity research. Valuable research provided by a sell-side research department to buy-side contacts in one quarter may cause contacts to select the sell-side firm in that quarter's broker vote. The broker vote, however, typically doesn't affect trade execution service decisions of the buy-side firm until at least the following quarter. Further, it can take time for equity research personnel (e.g., analysts, teams, and/or salespeople) to develop relationships with buy-side contacts such that the buy-side contacts are able to affect a broker vote or other execution distribution scheme at the buy-side firm. These and other factors make it very difficult for sell-side equity research departments to efficiently allocate resources.

According to various embodiments, the elasticity module 20 may be used to calculate elasticities of various accounts. The elasticities may be utilized by the sell-side firm, for example, to allocate research resources to different accounts and contacts. The elasticity for an account may define a historical relationship (e.g., in direction and degree) between revenues of the account and research department resources provided to the account. Elasticity may be expressed in several different forms. In various embodiments, however, elasticity may be expressed as the marginal change in account revenue resulting from a marginal change in research department resources allocated to the account, for example, as illustrated by Equation (A) below:

$$\beta = \frac{(\% \ changeinRevenue)}{(\% \ changeinResearchResources)} \quad (A)$$

In Equation (A), elasticity is indicated by β. A large positive elasticity for an account may indicate that increases in research resources provided to the account have historically resulted in large increases in account revenue. For such accounts, it may be desirable for the research department to increase the research resources provided to the account. Provided that historical patterns with the account hold, such an increase will lead to future revenue increases in excess of the cost of the additional research resources. On the other hand a small elasticity for an account, positive or negative, may indicate that the revenue from the account is largely unaffected by increases or decreases in provided research resources. For such accounts, it may be desirable for the research department to maintain current levels of research resources for the account or, in some circumstances, reduce the level of research resources provided to the account. Finally, a large negative elasticity may indicate that the revenue of the account has historically gone down as the equity research department has increased the provided research resources. For such accounts, it may be desirable for the research department to reduce the resources provided to the account.

Figure 2:
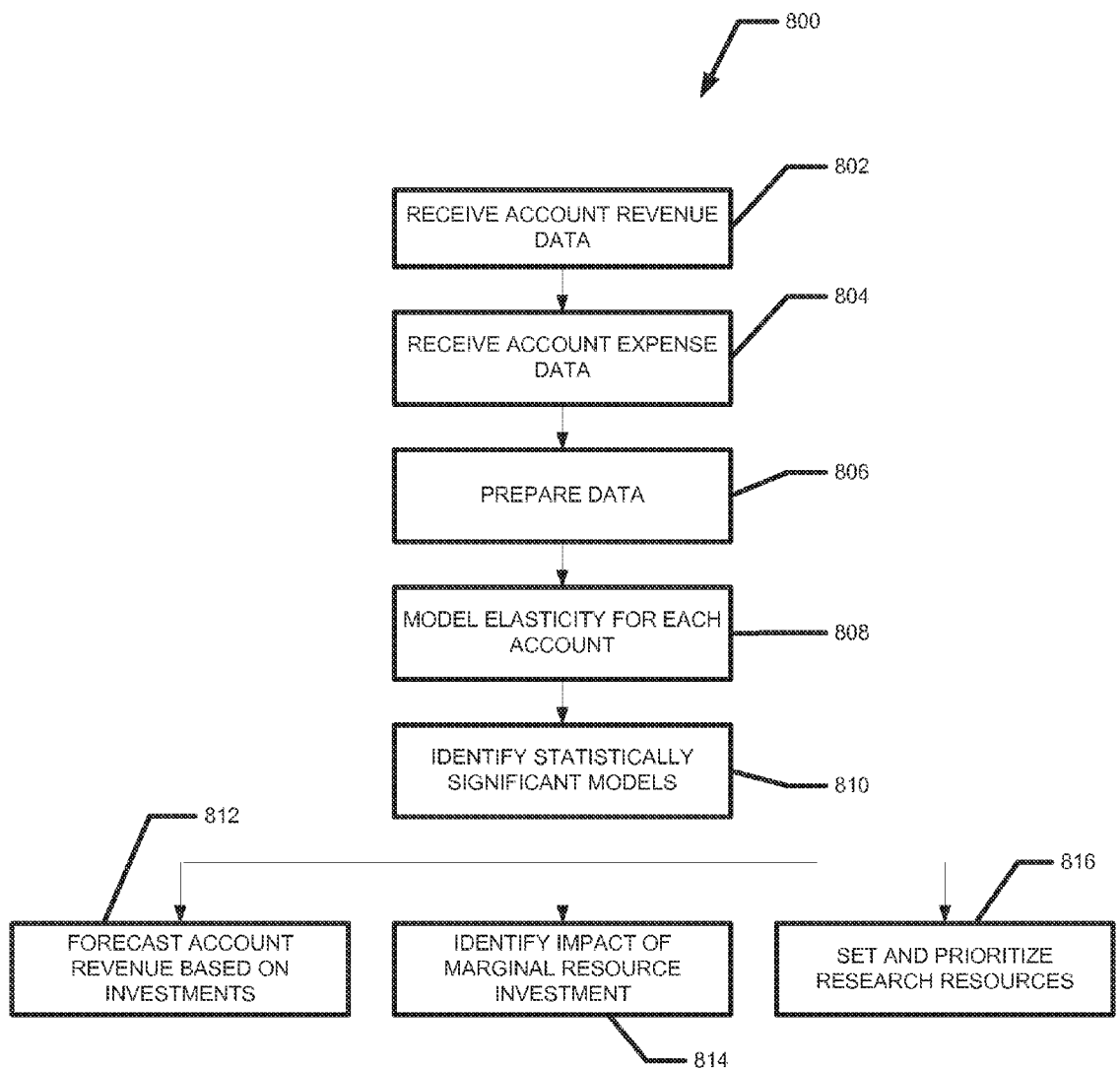
FIG. 2 is a chart illustrating one embodiment of a process flow for calculating the elasticity of a plurality of accounts of the sell-side firm.

FIG. 2 is a chart illustrating one embodiment of a process flow 800 for calculating the elasticity of a plurality of accounts of the sell-side firm. Some or all of the process flow 800 may be executed by the computer system 10, for example, by the elasticity module 20. Also, although the process flow 800 is described in terms of multiple accounts, it will be appreciated that the process flow 800 may be applied to a single account as well, and/or multiple instances of the process flow 800 may be implemented simultaneously or near-simultaneously, with each instance focusing on a single account.

At 802, the computer system 10 may receive account revenue data for the plurality of accounts of the sell-side firm. For example, the account revenue data may be received from the fund account data store 104. The account revenue data may describe present and/or historic execution revenue received from the sell-side firm from the accounts. In various embodiments, the data may include historic data for the accounts extended back multiple time periods (e.g., quarters). It will be appreciated that the account revenue data may be pre-processed in any suitable way. For example, in some embodiments, the account revenue data may represent net revenue considering the cost to the sell-side firm of providing execution services and/or a profit margin for the execution services themselves.

At 804, the computer system 10 may receive account expense data for the accounts. The account expense data may be received from any suitable source such as, for example, the cost data store 102 described herein. The account expense data may describe a cost to the sell side firm of providing research resources to each account. Account expense data may be received and/or calculated at any suitable and/or practical level of granularity. For example, in some embodiments, the account expense data may describe the research expenses incurred by the sell-side firm in behalf of each account as a whole. Also, in some embodiments, the account expense data may detail research expenses by, for example, the account contact receiving the resources, by resource type provided, by research department employee providing the resources, etc.

The expense data may be calculated directly by the computer system 10 and/or received from another system. The expense data may be calculated and/or collected in any suitable way. According to various embodiments, an estimate of the time that each sell-side research employee spends generating or distributing work product directed to each account (or contacts thereof) may be estimated. Time spent generating written work product items for general distribution may be divided (e.g., pro rata) amongst accounts and/or contacts who receive and/or read the respective written work product items. The time for each research employee (e.g., analyst team members, sales personnel, etc.) may be compensation-weighted to generate an associated cost. Costs for overhead and other expenses that cannot be attributed directly to an account may be divided (e.g., pro rata) amongst all accounts. Estimates of the time spent servicing the account by different research personnel may be generated in any suitable manner including, for example, direct timekeeping by research personnel, surveys distributed to timekeeping personnel, etc.

An additional method of finding the expense data indicative of the accounts may involve finding a cost per unit of different types of contact touches (e.g., phone calls with a contact, one-to-one or small group meetings with the contact, tailored emails or voicemails to the contact, blast emails or voicemails to the contact, written work product items, etc. Then the number and type of contact touches provided to the accounts (e.g., to contacts of the account) may be found and multiplied by the cost of each touch. The cost of each touch may be found, for example, based on the compensation-weighted time of each research employee that is required to generate and/or distribute the touch. Details of example methods of calculating research expense data for a sell-side firm account are described in U.S. Pat. No. 7, 734,517, which is incorporated herein by reference in its entirety.

Referring back to FIG. 2, the computer system 10 (e.g., via the elasticity module 20) may optionally prepare the account revenue data and account expense data at 806. Preparing the data may involve selecting accounts for modeling and, in some embodiments, may also involve data cleaning. Accounts may be selected for modeling according to any suitable criteria. For example, accounts that are unlikely to yield statistically significant measures of elasticity and/or accounts with revenues and/or expenses too small to justify changes in the research department's procedures may be omitted. In various embodiments, account and/or expenses revenue thresholds may be applied. For example, in some embodiments, accounts may be selected for modeling based only on account revenue (e.g., accounts having greater than $50,000 of revenue in the past year). In other embodiments, accounts may be selected for modeling based on a combination of revenue and expense (e.g., accounts having greater than $50,000 of revenue and greater than $25,000 of expenses). Different standards may be applied to different account types. For example, tiered accounts may be subjected to one standard, while non-tiered accounts may be subjected to another standard. Also, in some embodiments, different standards may be applied based on the geographic location of an account (or an office servicing the account), an industry of the account, etc. In various embodiments, accounts from a common geographic area and/or industry may be modeled together. Also, in some embodiments, an account may be omitted from modeling if it has zero revenue in all measured quarters.

In some embodiments, data preparation at 806 may also involve data cleaning. For example, data cleaning may involve modifying account expense and/or revenue data to improve the changes that the account will yield a statistically significant elasticity. Examples of data cleaning may involve, for example, setting any positive expense or negative revenue figures to zero and/or smoothing revenue in time. One type of revenue and/or expense smoothing may involve eliminating quarters with zero expenses and/or revenues by distributing expenses and/or revenues from surrounding quarters to the zero quarters. The distribution may take place according to any suitable method. Table 3 below illustrates revenue data for an example account before and after smoothing:

TABLE 3

| Period  | Revenue | Smooth Revenue |
|---------|---------|----------------|
| Q1 '07  | $—      | $146.23        |
| Q2 '07  | $—      | $146.23        |

TABLE 3-continued

| Period  | Revenue      | Smooth Revenue |
|---------|--------------|----------------|
| Q3 '07  | $—           | $146.23        |
| Q4 '07  | $584.92      | $146.23        |
| Q1 '08  | $3,034.65    | $3,034.65      |
| Q2 '08  | $137,491.79  | $137,491.79    |
| Q3 '08  | $1,577.25    | $1,577.25      |
| Q4 '08  | $310,954.23  | $310,954.23    |
| Q1 '09  | $43,621.81   | $43,621.81     |
| Q2 '09  | $168,624.05  | $168,624.05    |
| Q3 '09  | $171,233.68  | $171,233.68    |
| Q4 '09  | $283,297.89  | $283,297.89    |
| Q1 '10  | $145,705.43  | $145,705.43    |

At 808, the computer system 10 (e.g., via the elasticity module 20) may model the elasticity of each remaining account. The model may be generated according to any suitable method or form. For example, in some embodiments, elasticity, represented as $\beta$, may be modeled in the form set forth in Equation (B):

$$\ln(\text{Revenue}) = \beta * \ln(\text{Expense}) + c_0 \quad (B)$$

In Equation (B), Revenue may be the revenue received from an account. Expense may be the research expenses incurred on behalf of the account (e.g., the account expenses) and $c_o$ may be a constant. In some embodiments, other model forms may be used including, for example, those set forth in Equations (C) through (E) set forth below:

$$\%\text{ChangeinRevenue} = \%\text{ChangeinExpense} * \beta + c_0 \quad (C)$$

$$\%\text{ChangeinRevenue} = \%\text{ChangeinCumulativeExpense} * \beta + c_0 \quad (D)$$

$$\ln(\text{Revenue}) = \beta * \ln(\text{CumulativeExpense}) + c_0 \quad (E)$$

Each account under consideration may be represented by a model (e.g., one of Equations (B) through (E) or an alternative model). For example, one of the equation forms above may be fitted to data indicative of each account according to any suitable method (e.g., regression, least squares fitting, etc.).

Figure 3:
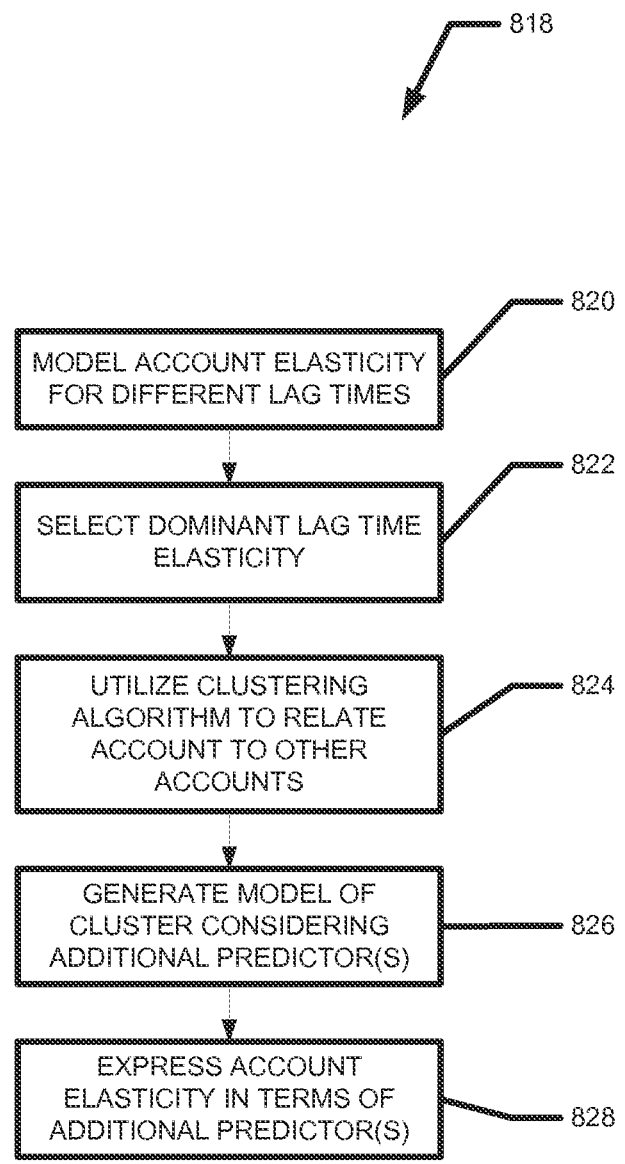
FIG. 3 is a chart illustrating one embodiment of a process flow for modeling the elasticity of a group of accounts considering lag time and additional predictors.

According to various embodiments, modeling the elasticity of an account may also comprise matching each account to an appropriate lag time between changes in research expense and corresponding changes in revenue. In some embodiments, additional predictors (e.g., independent variables) are also tested for possible addition to the model. FIG. 3 is a chart illustrating one embodiment of a process flow 818 for modeling the elasticity of a group of accounts considering lag time and additional predictors. The process flow 818, for example, may be executed by the computer system 10 (e.g., via the elasticity module 20 ). At 820, the computer system 10 (e.g., via the elasticity module) may model the elasticity of each account under consideration for different lag times. For example, each account may be modeled by fitting a model form (e.g., one of Equations (B) through (E)) to revenue and expense data for the account using regression, least squares fitting, or any other suitable method. Each account may be modeled multiple times with different lags between revenue and expense data. For example, in a first model, account revenue from a first quarter t may be modeled against expenses from a prior quarter t−1. In a second model, the account revenue from the first quarter t may be modeled against expenses from an older prior quarter t−2. In some embodiments, four different lag times may be tested, for example, as indicated by Equations (F) through (I) below:

$$\ln(\text{Revenue})_{account,t} = \ln(\text{Expense})_{account,t} * \beta_{account,t} + c_0 \quad (F)$$

$$\ln(\text{Revenue})_{account,t} = \ln(\text{Expense})_{account,t-1} * \beta_{account,t-1} + c_0 \quad (G)$$

$$\ln(\text{Revenue})_{account,t} = \ln(\text{Expense})_{account,t-2} * \beta_{account,t-2} + c_0 \quad (H)$$

$$\ln(\text{Revenue})_{account,t} = \ln(\text{Expense})_{account,t-3} * \beta_{account,t-3} + c_0 \quad (I)$$

Equations (F) through (I) are stated in terms of the model shown in Equation (B). It will be appreciated, however, that Equations (F) through (I) may be modified into any suitable form including, for example, the forms described above by Equations (D) through (E).

At 822, the dominant lag time for each account may be selected, and the model representing the dominant lag time for each account may be used going forward. The dominant lag time may be the lag that exhibits the most statistical significance (e.g., the model with the time lag that explains the most variation in revenue). For example, the dominant lag time may be indicated by the model that shows the best-fit between revenue and expenses. The best-fit and/or highest statistical significance may, in some embodiments, be determined using one or more of a t-test, an $R^2$ test, or residual analysis.

Optionally, at 824, 826 and 828, the computer 10 may modify the models of some or all of the elasticities to consider additional predictors and/or independent variables. Examples of additional predictors may include, for example, market volume, research personnel interacting with the account contacts, interaction with particular account contacts, etc. It will be appreciated that successful and/or meaningful modeling may require that each additional predictor added to a model be described by a threshold number of independent data points (e.g., ten (10)). Many desired predictors for addition to the elasticity models described herein, however, may not have the threshold number of data points per account. Accordingly, account clustering may be used, as described. At 824, accounts having similar properties may be clustered together. Any suitable clustering algorithm may be used including, for example, a KMeans algorithm and/or a Partition Around Medoid (PAM) algorithm. According to a PAM algorithm, k representative accounts are identified. These are referred to as medoids. The remaining accounts are assigned to a medoid group such that the sum of distances between each account to its closest medoid is minimized. Each group of accounts associated with a common medoid may be referred to as a cluster. Prior to clustering, each account lag and regression coefficient may be scaled, as indicated below:

$$\text{lag}_{scaled} = (\text{lag} - \text{mean}(\text{lag}))/\text{stdev}(\text{lag}) \quad (J)$$

$$\beta_{scaled} = (\beta - \text{mean}(\beta))/\text{stdev}(\beta) \quad (K)$$

According to various embodiments, the scaled lag and scaled elasticity of each account may be determined when, for example, determining medoids and assigning accounts to clusters.

At 826, a single model of each cluster may be found considering the desired additional predictors or independent variables. The single model may, in various embodiments, be of the same form as its constituent models. Also, in various embodiments, adding an additional predictor (e.g., other than account expense) to a model may comprise adding an additional term. Because multiple accounts are considered together, more independent variables may be available, allowing additional predictors to be added without negatively affecting the quality of the model.

Each cluster model may be found and fit to available data (e.g., revenue data, expense data, and data indicative of additional predictors) according to any suitable modeling method or methods. According to various embodiments, a Linear Mixed-Effect Model (LME) method may be used. Equation (L) below shows an LME model showing one additional predictor, market conditions:

$$\ln(\text{Revenue}_{cluster}) = \ln(\text{Expense}_{cluster}) * \beta_{cluster} + \ln(\text{MarketCondition}_{cluster}) * \beta_0 + c_0 \quad (L)$$

In Equation (L), $\beta_0$ may represent an elasticity constant. LME, or another utilized method, may account for variability of accounts within each cluster and may allow for the estimate of an average elasticity for all accounts in the cluster, $\beta_{cluster}$. An LME model may also include a random variable $b_{account}$, representing the deviation of each account from the cluster average elasticity. The elasticity of any particular account may be estimated from the average elasticity of the cluster according to Equation (M) below:

$$\beta_{account} = \beta_{cluster} + b_{account} \quad (M)$$

At 828, each account model may be individually expressed considering the additional predictor. For example, each account elasticity, $\beta_{account}$, account, may be backed out of its associated cluster model (e.g., utilizing Equation (M)).

In the example given above, one additional predictor or independent variable is added, i.e., market conditions. Market conditions, for example, may represent the total volume of trading on a market. For example, when trade volume is high, it is expected that all accounts of the sell-side firm have a total trading volume that roughly correlates to the overall market trade volume. Also, for example, when the price of a security or securities held by the account is moving, it can be expected that the account will increase their total trading volume (e.g., buying or selling). Because the revenue of the sell-side firm depends on the volume of trades that an account executes with the sell-side firm, it is, then, also expected that the sell-side firm's revenue will increase or decrease based on these market conditions, and independent of research expense. For example, when an account may make more trades due to market conditions, the account revenue to the sell-side firm will increase, even if the account has not transferred a larger proportion of there total trading volume to the sell-side firm. Considering market conditions (trade volume, market index values, etc.) as one or more predictors or independent variables may remove the dependency of account revenue on market conditions, allowing for a more accurate representation of the elasticity between account revenues and account expense.

In various embodiments, other additional predictors may be considered as well. For example, there may be a relationship between a type of research resource provided to an account and the account's elasticity. For example, an account may respond positively, or negatively, to certain types of written work product, personal attention from a particular analyst or sales person, etc. Accordingly, the resource type provided to the account may be considered. Additionally, an account may respond positively, or negatively, to resources provided to a particular account contact. Accordingly, the account contact to which resources are provided may be considered as an additional predictor.

Referring back to FIG. 2, at 810, the computer system 10 may identify statistically significant account models. For example, statistically significant account models may be identified using any suitable test such as, for example, a t-test, an $R^2$ test, or residual analysis. For example, a t-test may be utilized to determine a significance of the relationship between the account revenue and the selected predictors (e.g., market conditions, contacts, research personnel, etc.). If the t-test returns a significance above a threshold significance (e.g., 0.1), then the analyzed model may be considered statistically significant. According to an $R^2$ test, an account model may be analyzed to determine how much of the revenue variance is explained by the model. If the $R^2$ test returns a value above a threshold, then the analyzed model may be considered statistically significant. Residual analysis of a model may be performed graphically utilizing quantile plots to assess the normality of the residual and scatterplots, such as residual against the fitted values and/or predictors. This analysis may be used to assess model assumptions, such as constant variance and linearity, and to identify potential outlier values. Account models that are determined to be statistically significant, given, for example, one or more of the tests described above, may be further utilized. Those models found to lack statistical significance, in some embodiments, may be discarded.

Account models generated according to the process flow 800 may be utilized by the sell-side firm in many different ways. For example, at 812, the computer system 10 may forecast account revenue for a future time period (e.g., a quarter) given known research expenses in either a current or recently past time period. At 814, the computer system 10 may utilize the account models to identify the impact of marginal resource investment in different accounts. Table 4 below indicates results of such an analysis:

TABLE 4

| Account Type | Elasticity | For every $1 of expense spent servicing the account . . . |
| --- | --- | --- |
| Highly Elastic | elasticity > 1.25 | Sell-side firm receives more than $1.25 in revenue |
| Elastic | 1 > elasticity > 1.25 | Sell-side firm receives between $1 and $1.25 in revenue |
| Inelastic | 0 > elasticity > 1 | Sell-side firm receives less than $1 in revenue |
| Unexplained | elasticity = 0 | Sell-side firm cannot explain the amount of revenue we receive |
| Negatively Elastic | elasticity < 0 | Sell-side firm loses more than $1 in revenue |

At 816, research resources may be prioritized based on the account models. For example, research resources may be directed towards those modeled accounts that have an elasticity greater than or equal to one (1). Research resources may be directed away from accounts having negative elasticity. Also, in some embodiments, research resources may be directed away from accounts having a relatively small elasticity, for example, to transfer the resources to higher elasticity accounts. According to various embodiments, the resource allocations of 816 may be performed automatically by the computer system 10 or may be performed manually be research personnel upon receiving the completed account models.

Figure 4:
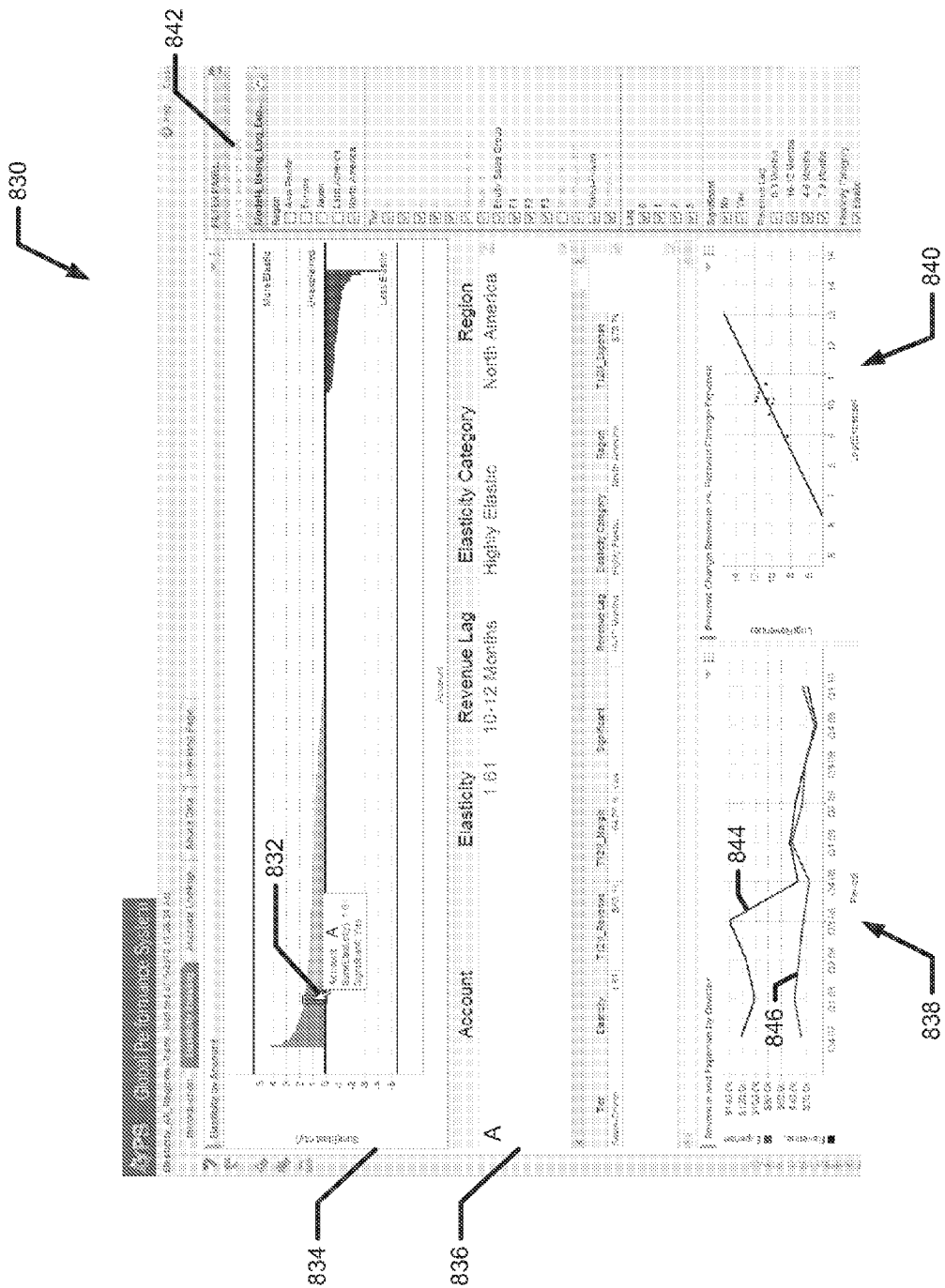
FIG. 4 is a screen shot showing one embodiment of an interface that may be provided to a salesperson showing the results of elasticity modeling, for example, as set forth in FIGS. 2 and/or 3.

FIG. 4 is a screen shot showing one embodiment of an interface 830 that may be provided to a salesperson showing the results of elasticity modeling, for example, as set forth in FIGS. 2 and/or 3. For example, the interface 830 may be provided to a salesperson, who may utilize the information provided therein for various purposes including, for example, the purposes described above with respect to 812, 814 and 816. The interface 830 may comprise a summary screen 834 showing the modeled elasticity of a plurality of accounts. The vertical axis of the summary screen 834 may represent elasticity, with accounts showing positive elasticity on the positive side of the axis, and accounts showing negative elasticity on the negative side of the axis. A filter field 842 may allow the salesperson to filter the accounts represented on the summary screen 834, for example, by geographic region, account tier, lag shown between expense and revenue, account significance, etc.

Figure 5:
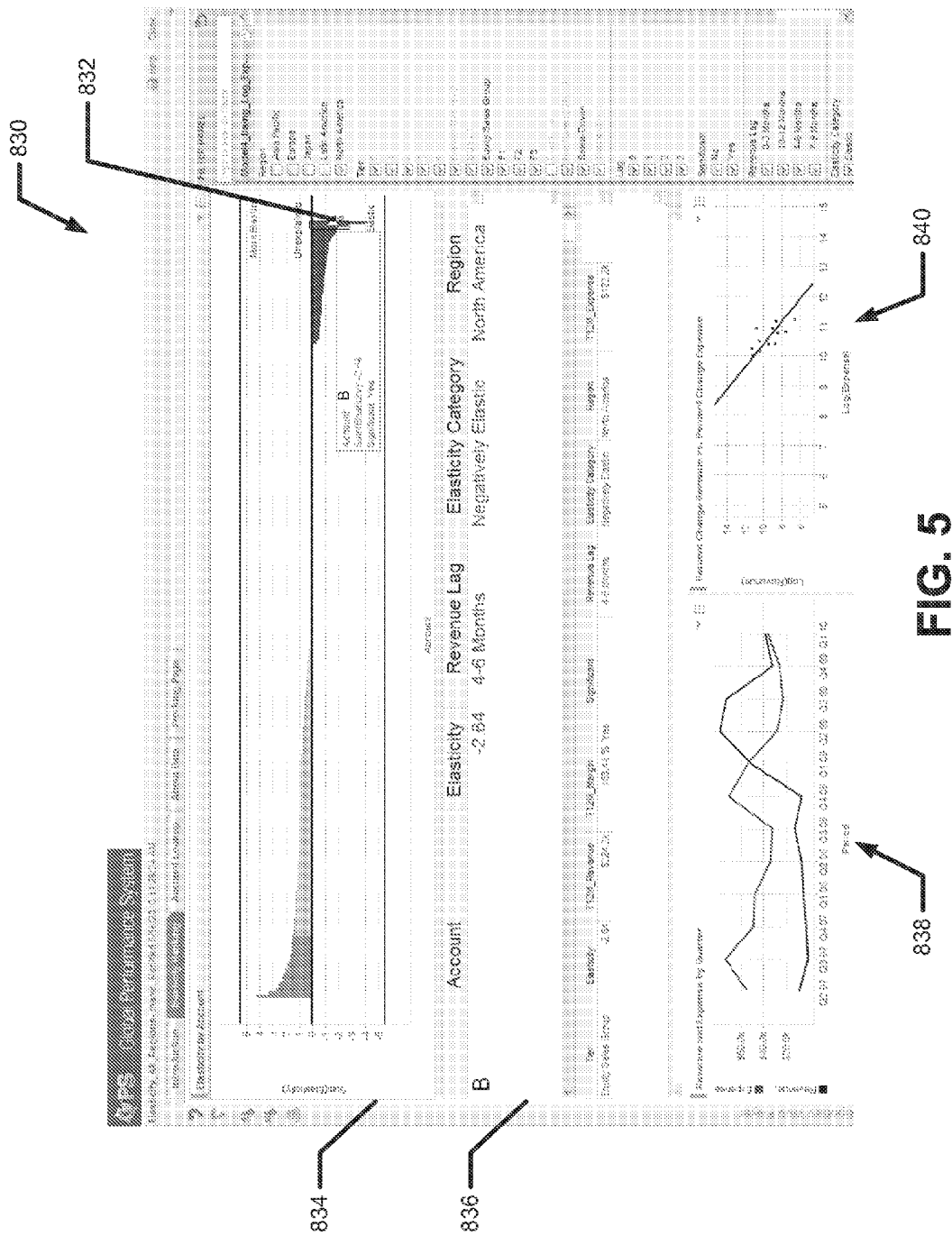
FIG. 5 is a screen shot showing another embodiment of the interface of FIG. 4.

According to various embodiments, the salesperson may be provided with functionality for selecting an account from the summary screen 834, for example, using the cursor 832. Selecting an account with the cursor 832, or other suitable mechanism, may cause the interface 830 to display additional information about the elasticity of the account at detail field 836 and graph fields 838 and 840. For example, in FIG. 4 an account "A" is selected at the summary screen 834. As illustrated, the account A has a positive elasticity. The account detail field 836 lists various information about the selected account including, for example, an account name, an account elasticity, the measured lag between expense and revenue, a category of elasticity, a region, account revenue, profit margin, account expense, etc. Profit graph field 838 shows a plot of account revenue 844 versus account expense 846. It can be seen from the graph field 838 that, despite a precipitous drop in account revenue in the fourth quarter of 2008, account A is still considered highly elastic. This may indicate that the elasticity model of account A was developed considering market conditions. An elasticity graph field 840 illustrates a log-log plot of the percent change in account revenue versus the percent change in account expense for account A. As illustrated, the sloop of the plot is positive, indicating a positive elasticity. FIG. 5 is a screen shot showing another embodiment of the interface 830 with a second account, account "B" selected at the summary screen 834. As illustrated, account B has a negative elasticity, as shown by the negative slop of the log-log pot shown in field 840.

According to various embodiments, instead of considering all predictors together, separate models may be generated by contact, analyst team, sales person, etc. For example, when sufficient data exists, a separate elasticity may be found for different combinations of sales people and contacts, analyst teams and contacts, etc. The models may be generated, for example, as described herein.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," "server," or "processor" may be, for example and without limitation, a processor, microcomputer, minicomputer, server, mainframe, laptop, personal data assistant (PDA), wireless email device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer systems may comprise one or more processors in communication with memory (e.g., RAM or ROM) via one or more data buses. The data buses may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A computer-implemented method for relating resources expended by a securities research entity to revenue received by a financial services firm including the securities research entity, the method comprising:
   receiving, by a computer system, account revenue data indicative of revenue received by the financial services firm from a first customer investment account for at least securities trade execution by the financial services firm for the first customer investment account, wherein the computer system comprises at least one processor and operatively associated memory;
   receiving, by the computer system, account expense data indicative of expenses incurred by the securities research entity on behalf of the first customer investment account;
   determining, by the computer system, a market condition-adjusted elasticity for the first customer investment account, wherein the market condition-adjusted elasticity indicates a relationship between the expenses incurred by the research entity on behalf of the first customer investment account and the revenue received by the financial services firm from the first customer investment account, wherein the market condition-adjusted elasticity is determined based on at least one market condition for securities, and wherein determining the market condition-adjusted elasticity for the first customer investment account comprises determining, by the computer system, a lag between changes in the expenses incurred by the securities research entity on behalf of the first customer investment account and corresponding changes in the revenue received by the financial services firm from the first customer investment account for at least securities trade execution by the financial services firm for the first customer investment account.

2. The method of claim 1, wherein determining the market-condition adjusted elasticity comprises fitting a model form to the account revenue data and the account expense data.

3. The method of claim 2, wherein the model form is expressed as:

$$\ln(\text{Revenue}) = \beta * \ln(\text{Expense}) + c_0$$

wherein:
   Revenue is the revenue received by the financial services firm from the first customer investment account for at least securities trade execution by the financial services firm for the first customer investment account;
   $\beta$ is the market condition-adjusted elasticity;
   Expense is the expenses incurred by the securities research firm on behalf of the first customer investment account; and
   $c_0$ is a constant.

4. The method of claim 2, further comprising receiving market conditions data indicative of market conditions related to the account revenue, wherein the generated mathematical model further indicates a relationship between the expenses incurred by the research entity, the market conditions and the revenue received by the financial services firm.

5. The method of claim 1,
   wherein the account revenue data is also indicative of revenue received by the financial services firm from a plurality of customer investment accounts for at least securities trade execution by the financial services firm for the plurality of customer investment accounts, wherein the plurality of customer investment accounts comprises the first customer investment account; and wherein the account expense data is also indicative of expenses incurred by the securities research entity on behalf of the plurality of customer investment accounts.

6. The method of claim 5, further comprising:
determining, by the computer system, a market-condition adjusted elasticity for each of the plurality of customer investment accounts; and
displaying a graphical user interface to a securities salesperson, wherein the graphical user interface displays the market-condition adjusted elasticity for at least one of the plurality of customer investment accounts.

7. The method of claim 5, further comprising applying at least one of a revenue threshold and an expense threshold to the plurality of customer investment accounts and removing from consideration any customer investment accounts from the plurality of customer investment accounts that do not exceed the revenue threshold.

8. The method of claim 5, further comprising smoothing the revenue data with respect to at least one of the plurality of customer investment accounts by distributing revenue from at least one time period to at least a second adjacent time period.

9. The method of claim 5, wherein generating the market condition-adjusted elasticity for the first customer investment account comprises:
clustering the first customer investment account with at least a second customer investment account selected from the plurality of customer investment accounts;
generating a cluster model of the first customer investment account and the at least a second customer investment account;
receiving additional predictor data indicative of at least one additional predictor of account revenue relating to at least one of the first customer investment account and the at least a second customer investment account;
adding the at least one additional predictor to the cluster model; and
calculating an elasticity of the first customer investment account considering the cluster model.

10. The method of claim 9, wherein the additional predictor comprises the at least one market condition and the cluster model is of the form:

$$\ln(\text{Revenue}_{cluster}) = \ln(\text{Expense}_{cluster}) * \beta_{cluster} + \ln(\text{MarketCondition}_{cluster}) * \beta_0 + c_0$$

wherein:
$\text{Revenue}_{cluster}$ is indicative of revenue received by the financial services firm from the first customer investment account and at least the second customer investment account for at least securities trade execution by the financial services firm for the first customer investment account and at least the second customer investment account;
$\text{Expense}_{cluster}$ is indicative of expenses incurred by the securities research entity on behalf of the first customer investment account and at least the second customer investment account;
$\beta_{cluster}$ is an elasticity describing the first customer investment account and at least the second customer investment account;
$\text{MarketCondition}_{cluster}$ is the at least one market condition;
$\beta_0$ is an elasticity constant; and
$c_0$ is a constant.

11. The method of claim 9, wherein the cluster is generated according to at least one algorithm selected from the group consisting of a Partition Around Medoid (PAM) algorithm and a KMeans algorithm.

12. The method of claim 9, wherein the cluster model is generated according to a Linear Mixed-Effect Model (LME) method.

13. The method of claim 9, wherein the at least one additional predictor is selected from the group consisting of a market condition, a contact of one of the plurality of customer investment accounts, and an analyst team.

14. The method of claim 1, wherein the account revenue data describes revenue received by the financial services firm from the first customer investment account during a first time period and the expense data describes expenses incurred by the research entity on behalf of the first customer investment account during a second time period, wherein the second time period lags the first time period.

15. A computer-implemented method for relating resources expended by a securities research entity to revenue received by a financial services firm including the securities research entity, the method comprising:
receiving, by a computer system, account revenue data indicative of revenue received by the financial services firm from a first customer investment account for at least securities trade execution by the financial services firm for the first customer investment account, wherein the account revenue data is also indicative of revenue received by the financial services firm from a plurality of customer investment accounts for at least securities trade execution by the financial services firm for the plurality of customer investment accounts, wherein the plurality of customer investment accounts comprises the first customer investment account, and wherein the computer system comprises at least one processor and operatively associated memory;
receiving, by the computer system, account expense data indicative of expenses incurred by the securities research entity on behalf of the first customer investment account, wherein the account expense data is also indicative of expenses incurred by the securities research entity on behalf of the plurality of customer investment accounts;
determining, by the computer system, a market condition-adjusted elasticity for the first customer investment account, wherein the market condition-adjusted elasticity indicates a relationship between the expenses incurred by the research entity on behalf of the first customer investment account and the revenue received by the financial services firm from the first customer investment account, and wherein the market condition-adjusted elasticity is determined based on at least one market condition for securities;
determining, by the computer system, a market-condition adjusted elasticity for each of the other customer accounts comprising the plurality of customer investment accounts; and
displaying a graphical user interface to a securities salesperson, wherein the graphical user interface displays the market-condition adjusted elasticity for at least one of the plurality of customer investment accounts, wherein the graphical user interface comprises: a summary field showing a graphical representation of modeled market-condition adjusted elasticity for each of the plurality of customer investment accounts; and at least one field showing customer investment account-specific information describing an elasticity of one of the plurality of customer investment accounts.

16. The method of claim 15, wherein the customer investment account-specific information comprises at least datum selected from the group consisting of: a name of the customer investment account, an elasticity of the customer investment account, a revenue lag of the customer investment account, an elasticity category of the customer investment account, a plot of revenue versus expenses and a plot of percent change in revenue versus percent change in expenses.

17. A computer-implemented method for relating resources expended by a securities research entity to revenue received by a financial services firm including the securities research entity, the method comprising:

receiving, by a computer system, account revenue data indicative of revenue received by the financial services firm from a first customer investment account for at least securities trade execution by the financial services firm for the first customer investment account wherein the computer system comprises at least one processor and operatively associated memory;

receiving, by the computer system, account expense data indicative of expenses incurred by the securities research entity on behalf of the first customer investment account;

determining, by the computer system, a market condition-adjusted elasticity for the first customer investment account, wherein the market condition-adjusted elasticity indicates a relationship between the expenses incurred by the research entity on behalf of the first customer investment account and the revenue received by the financial services firm from the first customer investment account, and wherein the market condition-adjusted elasticity is determined based on at least one market condition for securities, wherein the elasticity is of the form:

$$\beta = \frac{\% \, ChangeinRevenue}{\% \, ChangeinExpense}$$

wherein:
$\beta$ is the elasticity;
%ChangeinRevenue is a percentage change in revenue to the financial services firm from the first customer investment account; and
%ChangeinExpense is a percentage change in expenses incurred by the research entity on the first customer investment account.

18. A computer-implemented method for relating resources expended by a securities research entity to revenue received by a financial services firm including the securities research entity, the method comprising:

receiving, by a computer system, account revenue data indicative of revenue received by the financial services firm from a first customer investment account for at least securities trade execution by the financial services firm for the first customer investment account, wherein the computer system comprises at least one processor and operatively associated memory;

receiving, by the computer system, account expense data indicative of expenses incurred by the securities research entity on behalf of the first customer investment account;

determining, by the computer system, a market condition-adjusted elasticity for the first customer investment account, wherein the market condition-adjusted elasticity indicates a relationship between the expenses incurred by the research entity on behalf of the first customer investment account and the revenue received by the financial services firm from the first customer investment account, and wherein the market condition-adjusted elasticity is determined based on at least one market condition for securities, wherein determining the market condition-adjusted elasticity comprises:

generating a plurality of versions of a mathematical model, wherein each of the plurality of versions assumes a different lag between expenses incurred by the research entity on behalf of the first customer investment account and revenue received by the financial services firm; and selecting one of the plurality of versions of the mathematical model as a dominant version.

19. The method of claim 18, wherein the dominant version is the version selected from the plurality of versions having the highest level of statistical significance.

20. The method of claim 19, wherein a statistical significance of each of the plurality of versions is selected utilizing at least one algorithm selected from the group consisting of a t-test, an $R^2$ test and residual analysis.

21. A computer-based system for relating resources expended by a securities research entity to revenue received by a financial services firm including the securities research entity, the system comprising:

a computer system comprising at least one processor and operatively associated memory, wherein the at least one computer system is programmed to:

receive account revenue data indicative of revenue received by the financial services firm from a first customer investment account for at least securities trade execution by the financial services firm for the first customer investment account;

receive account expense data indicative of expenses incurred by the research entity on behalf of the first customer investment account; and determine a market condition-adjusted elasticity for the first customer investment account, wherein the market condition-adjusted elasticity indicates a relationship between the expenses incurred by the research entity on behalf of the first customer investment account and the revenue received by the financial services firm from the first customer investment account, and wherein the market condition-adjusted elasticity is determined based on at least one market condition for securities, and wherein determining the market condition-adjusted elasticity for the first customer investment account comprises determining a lag between changes in the expenses incurred by the securities research entity on behalf of the first customer investment account and corresponding changes in the revenue received by the financial services firm from the first customer investment account for at least securities trade execution by the financial services firm for the first customer investment account.

* * * * *